Figure 1:
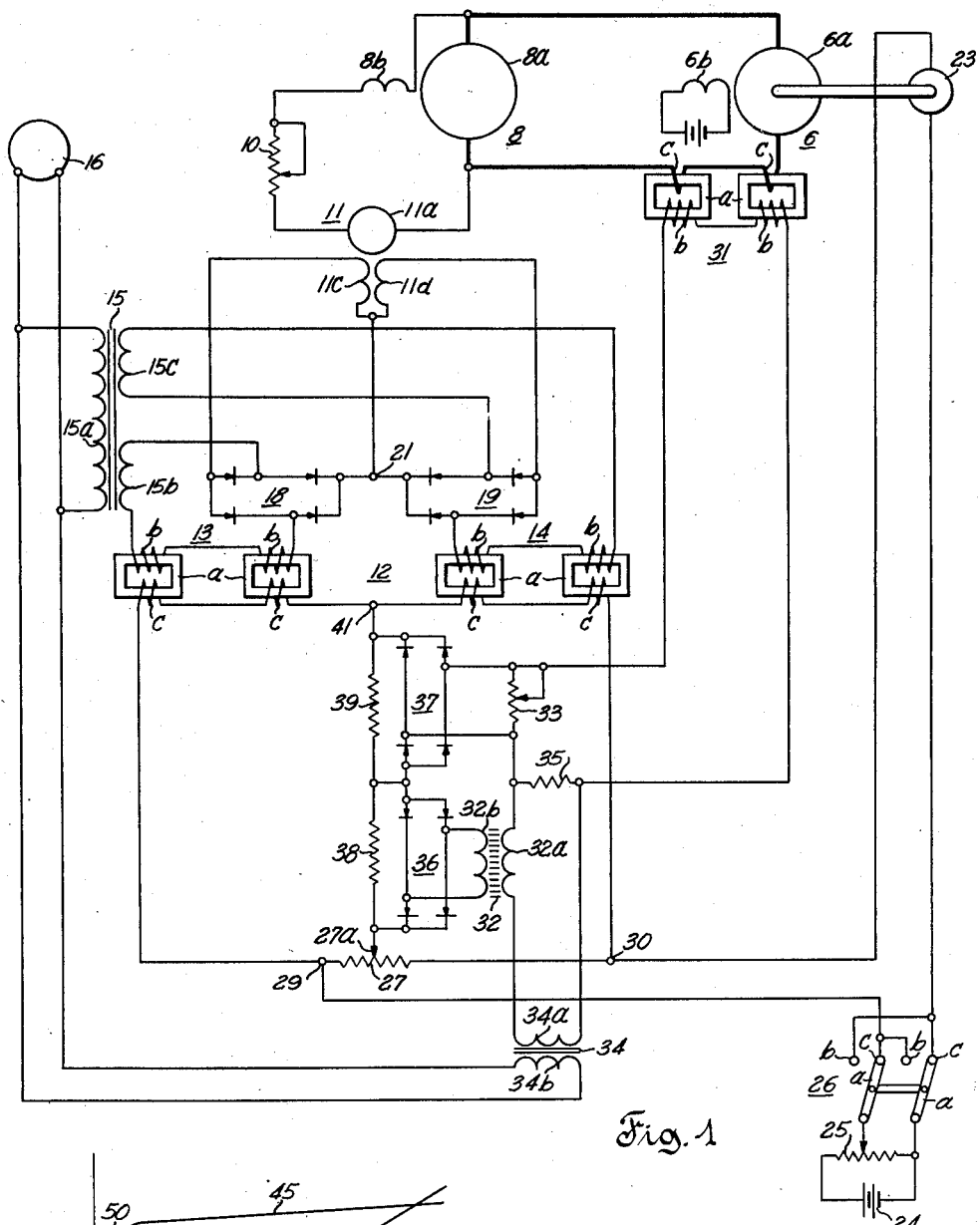

April 27, 1954     D. J. SIKORRA     2,677,085
CONTROL SYSTEM RESPONSIVE TO TWO REVERSIBLE VOLTAGES
Filed Feb. 9, 1951     2 Sheets-Sheet 1

Inventor
Daniel J. Sikorra
by Walter L. Maddox, Jr.
Attorney

April 27, 1954  D. J. SIKORRA  2,677,085
CONTROL SYSTEM RESPONSIVE TO TWO REVERSIBLE VOLTAGES
Filed Feb. 9, 1951  2 Sheets-Sheet 2

Inventor
Daniel J. Sikorra
by Walter S. Madden Jr.
Attorney

Patented Apr. 27, 1954

2,677,085

UNITED STATES PATENT OFFICE 2,677,085

CONTROL SYSTEM RESPONSIVE TO TWO REVERSIBLE VOLTAGES

Daniel J. Sikorra, Milwaukee, Wis., assignor to Allis-Chalmers Manufacturing Company, Milwaukee, Wis.

Application February 9, 1951, Serial No. 210,134

11 Claims. (Cl. 318—142)

This invention relates in general to improvements in electric control systems and in particular to means for controlling a dynamoelectric machine to limit the magnitude of operating conditions thereof.

Dynamoelectric machine control systems are known in which means which are normally operative to maintain constant a first operating condition of the machine, such as voltage, current, speed or power, are overcome by the action of protective means responsive to a second operating condition of the machine attaining a limiting value. In most of such systems, the electrical signal from the protective means completely overcomes the signal responsive to the first operating condition, so that the first signal has no effect on the control of the motor until the second condition has returned to a desired value. Such systems usually compare voltages or currents proportional to the operating conditions and utilize the difference between the compared quantities to return the second operating condition to a desired value.

Such systems have the disadvantage that if, at the time the second operating condition exceeds the limiting value, the first operating condition is such that the first signal tends to cause the second operating condition to further exceed the limiting value, the magnitude of the second signal must be greater than the magnitude of the first signal to produce any limiting effect and the limiting effect will only be proportional to the difference between the two signals, thereby decreasing the corrective signal available. An additional disadvantage of such systems is that they provide no means for utilizing the first signal to aid in preventing the second operating condition from substantially exceeding the limiting value.

The above disadvantage may be overcome by utilizing a control system in which the first signal is effective to aid the second signal in preventing the second operating condition from substantially exceeding the predetermined limiting value.

It is therefore an object of this invention to provide an improved electric control system for the simultaneous control of two operating characteristics of a dynamoelectric machine.

It is an additional object of the present invention to provide a electric control system in which a signal responsive to deviations of a controlled condition is operative to prevent another controlled condition from substantially exceeding a limit value.

Figure 2:
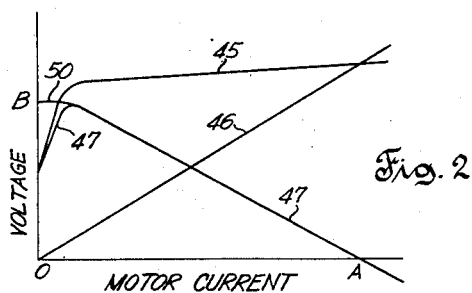
Figure 3:
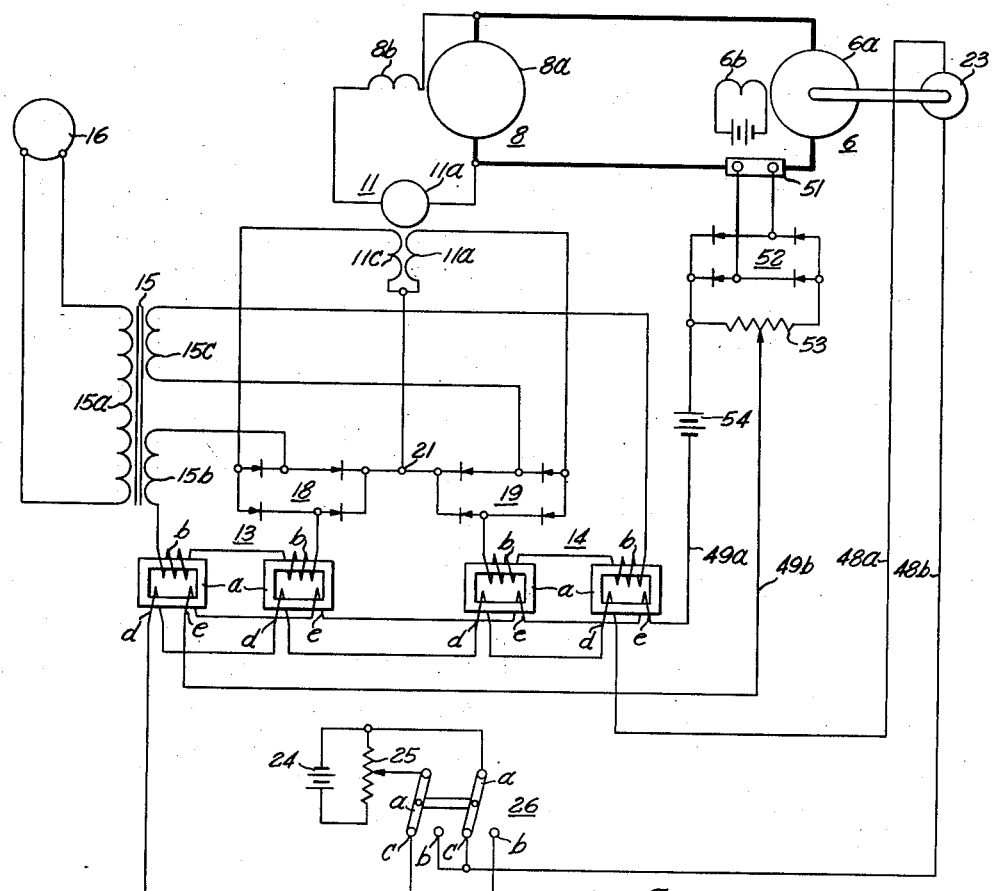
Figure 4:
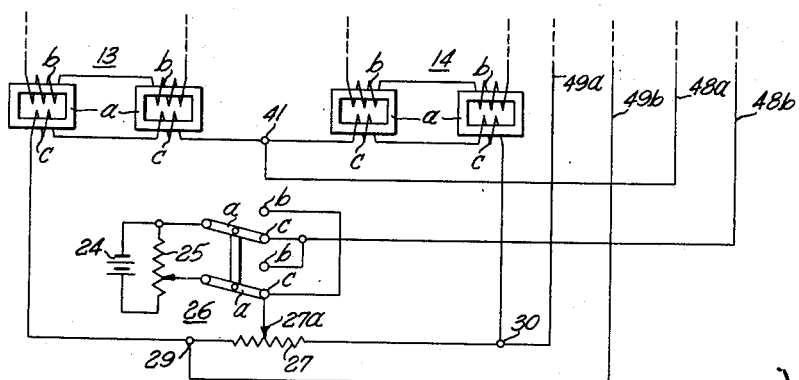

Objects and advantages other than those set forth will be apparent from the following description when read in connection with the accompanying drawing, in which:

Fig. 1 diagrammatically illustrates the circuits and apparatus of one embodiment of the invention;

Fig. 2 is a graph including a group of curves illustrating operating characteristics of some of the elements shown in Fig. 1;

Fig. 3 diagrammatically illustrates the circuits and apparatus of an alternate embodiment of the invention; and Fig. 4 partially illustrates an additional alternate embodiment of the invention.

Referring to Fig. 1, one embodiment of the invention is illustrated controlling operating characteristics of a translating device such as a dynamoelectric machine 6 having an armature 6a and a field winding 6b. Machine 6 may be a direct current motor driving any suitable load device, now shown, and supplied with current from any suitable controllable source such as the armature 8a of a generator 8. Generator 8 is provided with a field winding 8b connected across armature 8a in series with an adjustable resistor 10 and the armature 11a of a buck-boost exciter 11. Exciter 11 is provided with a pair of differentially acting field windings 11c, 11d for controlling the voltage of armature 11a.

Field windings 11c, 11d are energized through a polarized magnetic amplifier 12 in response to variations in the operating characteristics of motor 6. Amplifier 12 comprises a first saturable reactor 13 provided with a pair of saturable cores 13a, a reactance winding 13b divided into two portions severally wound on the two cores and a control winding 13c likewise divided into two portions. Amplifier 12 further comprises a second saturable reactor 14 having a pair of saturable cores 14a, a reactance winding 14b and a control winding 14c. Reactance winding 13b is energized from a suitable alternating current source such as a secondary winding 15b of a transformer 15 having its primary winding 15a connected to an alternator 16. Reactance winding 14b is likewise energized from alternator 16 through a secondary winding 15c of transformer 15. Windings 13c, 14c comprise control winding means for varying the saturations of cores 13a, 14a.

A first full wave rectifier 18 has its alternating current terminals connected in circuit with windings 13b, 15b, and a second full wave rectifier 19 is similarly connected in circuit with windings 14b, 15c. A direct current terminal of rectifier 18 is connected to a direct current terminal of like polarity of rectifier 19 through a common terminal 21 of field windings 11c, 11d. The other direct current terminals of rectifiers 18, 19 are connected to the other terminals of windings 11c, 11d, respectively, so that windings 11c, 11d are energized in dependence upon the reactances of windings 13b, 14b, respectively.

Control windings 13c, 14c have impressed thereon a unidirectional signal voltage having a polarity and a magnitude dependent upon the direction and magnitude of variations in the regulated operating characteristic from a desired value. If it is desired to regulate the speed of motor 6, the motor may be provided with any suitable known means, such as a tachometer generator 23, to provide a voltage proportional to the speed of the motor. The voltage of generator 23 is compared with the voltage of a suitable reference source, such as a battery 24 supplying a voltage divider 25 through a reversing switch 26, to produce the desired signal voltage. This signal voltage is impressed between a pair of terminals 29, 30 in circuit with resistance means comprising an adjustable resistor 27 connected across windings 13c, 14c. Switch 26 is provided with blades 26a and sets of contacts 26b, 26c to reverse the connection of divider 25 to generator 23 to reverse the direction of rotation of motor 6.

To prevent an operating condition of motor 6 other than the condition being regulated from substantially exceeding a limit value, amplifier 12 is provided with a bias voltage dependent upon the operating condition. If it is desired to prevent the current in motor 6 from substantially exceeding a predetermined maximum value, suitable means responsive to this current are provided, such as a third saturable reactor 31 having a pair of saturable cores 31a, a reactance winding 31b and a saturating winding 31c. Saturating winding 31c is connected between generator 8 and motor 6 to be traversed by a current proportional to the current flowing in armature 6a so that the reactance of winding 31b varies in response to variations in current of motor 6.

Reactance winding 31b is connected in circuit with an adjustable resistor 33 and the primary winding 32a of a saturable transformer 32, and these elements are energized from the secondary winding 34a of a transformer 34 having a primary winding 34b connected to machine 16. Resistor 33 and winding 31b are bypassed by a resistor 35. Transformer 32 is provided with a secondary winding 32b connected to the alternating current terminals of a full wave rectifier 36, and a similar full wave rectifier 37 is connected across resistor 33. Resistors 38, 39 are connected across the direct current terminals of rectifiers 36, 37, respectively. One direct current terminal of rectifier 36 is connected to a direct current terminal of like polarity of rectifier 37, so that a voltage proportional to the difference between the voltages of winding 32b and of resistor 33 appears between the noncommon terminals of resistors 38, 39. One of such noncommon terminals is connected to an adjustable tap 27a of resistor 27 and the other noncommon terminal is connected to a common terminal 41 of windings 13c, 14c. If required, the regulating system may be provided with any suitable known damping means for stability.

In operation of the system, assuming that switch 26 is in a position to close contacts 26c and that generator 8 is running and has a predetermined polarity, motor 6 runs at a speed and in a direction determined by the voltage and polarity of armature 8a and the fixed current in field winding 6b. Assuming that motor 6 is operating at the desired speed, the voltage of tachometer generator 23 is equal in magnitude and opposite in polarity to the voltage of the adjustable portion of voltage divider 25 so that no signal voltage is impressed on resistor 27 and windings 13c, 14c by generator 23 and divider 25. Under these conditions, the saturations of cores 13a, 14a are determined by the bias voltage impressed on windings 13c, 14c from resistor 33 and transformer 32.

Curve 45 of Fig. 2 is the volt-ampere characteristic of transformer 32, showing the relation between the voltage of winding 32b and the current in winding 32a. The volt-ampere characteristic of resistor 33 is shown by the straight line 46 of Fig. 2. The difference between the voltages of resistor 33 and of winding 32b, which difference is proportional to the bias voltage impressed between terminal 41 and adjustable tap 27a, is represented by curve 47 of Fig. 2. The axis of abscissa of Fig. 2 is scaled in terms of the current flowing in the motor armature 6a since reactor 31 acts similarly to a current transformer to supply to resistor 33 and winding 32a a current proportional to the current in armature 6a. Fig. 2 shows that for a predetermined current OA in motor 6, the voltage of resistor 33 is equal to the voltage of winding 32b, so that the bias voltage impressed between terminal 41 and tap 27a is zero, and that the polarity and magnitude of this bias voltage vary in dependence upon the direction and magnitude of variations in the motor current from the value OA. For motor currents below this value, tap 27a is at a positive potential with respect to terminal 41. Resistor 33 is adjusted so that the current OA represents the predetermined limit current which is to be permitted in motor 6.

If resistor 35 was not connected in circuit with windings 32a, the bias voltage would be substantially zero when the motor current is zero, since the reactance of winding 31b approaches infinity under this condition and substantially no current would be supplied to resistor 33 and winding 32a. Actually, resistor 35 supplies a small predetermined current to winding 32a from winding 34a so that at low motor currents the bias voltage follows line 50 instead of curve 47 to provide an initial bias voltage OB at zero current in motor 6.

With no voltage impressed between terminals 29, 30 by tachometer generator 23 and divider 25 and with the motor current below the predetermined maximum value OA, the bias voltage impressed on windings 13c, 14c has a magnitude intermediate zero and OB, depending upon the magnitude of the current in motor 6. Assuming that tap 27a is at the midpoint of resistor 27, this bias voltage saturates cores 13a, 14a equally, producing equal reactances in windings 13b, 14b and causing equal currents to flow through differentially acting field windings 11c, 11d. The net magnetomotive force of windings 11c, 11d is zero under these conditions, so that the voltage of armature 11a is zero. Assuming that resistor 18 is adjusted so that armature 8a supplies to field winding 8b all the current required to maintain the voltage of armature 8a at any given value, field winding 8b maintains the voltage of armature 8a at the value required to keep the speed of motor 6 at the desired value.

If the speed of motor 6 increases slightly above the desired value, the voltage of tachometer generator 23 exceeds the voltage of divider 25, producing a signal voltage which causes terminal 30, for example, to become positive with respect to terminal 29. If the motor current is below the maximum value OA, this signal voltage acts cumulatively with the bias voltage with respect to winding 14c, thereby increasing the saturation of cores 14a and increasing the currents through reactance winding 14b and field winding 11d. The signal voltage acts differentially with the bias voltage with respect to winding 13c, thereby decreasing the saturation of cores 13a and the currents through reactance winding 13b and field winding 11c. An increase in current in field winding 11d with respect to the current in field winding 11c produces in armature 11a a voltage which opposes the voltage of armature 8a, thereby reducing the current through field winding 8b to reduce the voltage of armature 8a to return the speed of motor 6 to the desired value.

If the speed of motor 6 decreases slightly below the desired value, with the current of armature 6a below the limit value, the action of the regulating means to return the speed to the desired value is the reverse of that described above.

During acceleration of machine 6 or when the speed of the motor decreases considerably below the desired value, the voltage of voltage divider 25 exceeds the voltage of tachometer generator 23 to impress a signal voltage between terminals 29, 30 which, if the motor current is below the maximum value OA, increases the current through field winding 11c above the current in winding 11d to produce in armature 11a a voltage tending to increase the voltage of armature 8a and increase the speed of motor 6 to the desired value. Owing to the high gain in machine 11 and amplifier 12 the motor current may tend to exceed the predetermined maximum value OA, during such acceleration. As the motor current approaches the value OA, the bias voltage is reduced along curve 47 to reduce the current through field winding 11c until at the current OA, the bias voltage is zero.

With zero bias voltage, the signal voltage is ineffective to increase the excitation of winding 8b because the signal voltage saturates cores 13a, 14a equally to produce equal currents through field windings 11c, 11d, resulting in zero voltage on armature 11a regardless of the magnitude of the signal voltage, to prevent the motor current from substantially exceeding the limit value.

If the motor current increases above the limit value OA, the bias voltage reverses polarity and increases in magnitude. The bias voltage then acts cumulatively with the signal voltage on winding 14c and acts differentially with the signal voltage on winding 13c. This action increases the saturation of cores 14a above the saturation of cores 13a and increases the current in winding 11d above the current in winding 11c to produce in armature 11a a voltage opposing the voltage of armature 8a to reduce the current in field winding 8b. This action continues until the current supplied to motor 6 has decreased to the value OA.

Thus, the bias voltage exercises a supervisory control over the signal voltage to prevent the motor current from substantially exceeding the limit value, and if the current does exceed the limit value, the action of the bias voltage is to invert the action of the signal voltage to cause the signal voltage to aid in returning the current to the limit value.

When the speed of motor 6 increases considerably above the desired value, or when it is desired to decelerate machine 6 from a given speed, the voltage of voltage divider 25 is reduced below the voltage of tachometer generator 23 to produce a signal voltage which renders terminal 30 positive with respect to terminal 29. This signal voltage acts cumulatively with the bias voltage on winding 14c and acts differentially with the bias voltage on winding 13c to increase the current through field winding 11d above the current in field winding 11c and thereby produce in armature 11a a voltage opposing the voltage of armature 8a. This action reduces the energization of winding 8b to reduce the voltage of armature 8a. If motor 6 is driving a high inertia load, the voltage of motor 6 will then exceed the voltage of armature 8a to cause motor 6 to act as a generator supplying current to drive generator 8 as a motor. This action reverses the direction of current flow between machines 6, 8 and through saturating winding 31c, but does not reverse the polarity of the bias voltage as long as the motor current does not exceed the limit value because reactor 31 is not responsive to the polarity of the current in winding 31c.

Motor 6 is thus regeneratively braked to the speed determined by the setting of divider 25. If during such regenerative braking the motor current approaches the limit value, the bias voltage is gradually reduced along curve 47 to reduce the energization of field winding 11d to increase the net voltage acting on winding 8b. An increase in the energization of winding 8b increases the voltage of armature 8a to reduce the voltage differential between armatures 6a, 8a and thereby reduce the current flowing between the two armatures. If the current reaches the value OA the bias voltage is zero to produce zero net magnetomotive force in windings 11c, 11d and zero voltage on armature 11a.

If the current in armature 6a increases above the limit value, the bias voltage reverses polarity and increases in magnitude. This action inverts the action of the signal voltage to cause amplifier 12 to supply current to field winding 11c in excess of the current supplied to winding 11d to produce in armature 11a a voltage aiding the voltage of armature 8a to thereby further increase the voltage of armature 8a until the current in armature 6a has returned to the predetermined limit value. Thus, the regulator of this invention operates at all times to prevent the current in motor 6 from substantially exceeding a predetermined value independently of the polarity of the motor current.

To cause motor 6 to rotate in the direction opposite to that described above, switch 26a is moved to close contacts 26b to impress across resistor 27 a signal voltage rendering terminal 30 positive with respect to terminal 29. This causes the bias voltage and the signal voltage to act cumulatively on winding 14c and to act differentially on winding 13c to increase the energization of winding 11d above the energization of winding 11c. The voltage of armature 11a thereupon builds up to produce across armature 8a a voltage of a polarity opposite to that described above for the forward direction of rotation of motor 6 to cause reverse rotation of motor 6. The system then operates as described above to maintain the speed of motor 6 substantially constant and to prevent the current in motor 6 from substantially exceeding the predetermined limit value.

Fig. 3 illustrates an alternate embodiment of the invention in which reactors 13, 14 are provided with control winding means in the form of signal windings 13d, 14d and bias windings 13e, 14e. Signal windings 13d, 14d are connected to be energized through a pair of conductors 49a, 49b by a signal voltage equal to the difference between the voltage of tachometer generator 23 and the voltage of the adjustable portion of voltage divider 25. Bias windings 13e, 14e are energized through a pair of conductors 49a, 49b by means including a shunt 51 connected in circuit with generator 8 and motor 6. The alternating current terminals of a full wave rectifier 52 are connected to shunt 51 and the direct current terminals of rectifier 52 are connected across a voltage divider 53 to impress across divider 53 a voltage of a fixed polarity proportional to the current of either polarity in motor 6. Bias windings 13e, 14e are serially connected with each other across divider 53 in series with a battery 54 which opposes the voltage of divider 53.

Windings 13d, 13e, 14d, 14e are so connected that one of the bias windings 13e, 14e acts differentially with respect to its associated signal winding and the other bias winding acts cumulatively with respect to its associated signal winding for one direction of current flow through the windings, and the one bias winding acts cumulatively with its associated signal winding and the other bias winding acts differentially with its associated signal winding for the other direction of current flow through the windings.

In operation, assuming that motor 6 is operating at the desired speed, the voltage of tachometer generator 23 is equal to the voltage of divider 25 so that no voltage is impressed across signal windings 13d, 14d. If the current in motor 6 is below the predetermined limit value, the voltage of battery 54 exceeds the voltage of divider 53 by an amount determined by the magnitude of the motor current to impress across bias windings 13e, 14e a predetermined bias voltage. With no voltage across signal windings 13d, 14d, this bias voltage saturates cores 13a, 14a equally to cause equal currents to flow through field windings 11c, 11d. These equal currents in windings 11c, 11d cause the voltage of armature 11a to be zero so that machine 8 maintains the speed of motor 6 at the desired value.

If the speed of motor 6 increases slightly above the desired value, the voltage of generator 23 increases above the voltage of divider 25 to impress a signal voltage across signal windings 13d, 14d. This causes windings 14d, 14e to act cumulatively to increase the saturation of cores 14a and causes windings 13d, 13e to act differentially with respect to each other to reduce the saturation of cores 13a. This action increases the current through field winding 11d with respect to the current through field winding 11c to produce across armature 11a a voltage opposing the voltage of armature 8a, thereby reducing the energization of field winding 8b and returning the speed of motor 6 to the desired value.

If the speed of motor 6 decreases slightly below the desired value, the voltage of divider 25 exceeds the voltage of generator 23 to produce a signal voltage which increases the current through field winding 11c with respect to the current in field winding 11d to return the motor speed to the desired value.

If, during acceleration of motor 6 or when the speed of motor 6 decreases considerably below the desired value, with the energization of field winding 11c exceeding the energization of field winding 11d to bring the motor up to the desired speed, the current in motor 6 increases toward the limit value, the voltage of divider 53 approaches in magnitude the voltage of battery 54 to reduce the bias voltage impressed on bias windings 13e, 14e, thereby reducing the energization of winding 11c. When the motor current reaches the predetermined limit value the voltage of divider 53 equals the voltage of battery 54 so that no voltage is impressed on bias windings 13e, 14e. The signal voltage then produces equal saturations in cores 13a, 14a so that the currents through windings 11c, 11d are equal to produce a net magnetomotive force of zero in these windings.

If the motor current increases beyond the limit value, the voltage of divider 53 exceeds the voltage of battery 54 to reverse the polarity of the voltage applied to bias winding 13e, 14e. This inverts the action of the signal voltage, as in Fig. 1, to cause the energization of field winding 11d to exceed the energization of winding 11c to return the motor current to the predetermined limit value.

Thus, the embodiment of Fig. 3 operates in a manner similar to that described above in connection with Fig. 1 to maintain the speed of motor 6 substantially constant and to prevent the motor current from substantially exceeding a predetermined value.

Fig. 4 illustrates an additional alternate embodiment of the invention in which the bias voltage, obtained from a suitable source, such as voltage divider 53 and battery 54 as in Fig. 3, is impressed across resistor 27 which is connected to the control windings 13c, 14c as in Fig. 1. The signal voltage, obtained from a suitable source such as tachometer generator 23 and voltage divider 25, is impressed between the adjustable tap 27a of resistor 27 and the common terminal 41 of windings 13c, 14c. Thus, the connections of the bias and signal voltage sources in Fig. 4 are the reverse of the connections illustrated in Fig. 1. However, the embodiment of Fig. 4 operates in a manner identical to that described above in connection with Fig. 1 to maintain the speed of motor 6 substantially constant and to prevent the motor current from substantially exceeding a predetermined value.

Although but a few embodiments of the present invention have been illustrated and described, it will be apparent to those skilled in the art that various changes and modifications may be made therein without departing from the spirit of the invention or the scope of the appended claims.

It is claimed and desired to secure by Letters Patent:

1. In a system for maintaining the speed of an electric motor substantially constant at a predetermined value, the combination of a source of current for supplying said motor, a polarized magnetic amplifier comprising a first saturable reactor having a first reactance winding and a first control winding and a second saturable reactor having a second reactance winding and a second control winding, means including a tachometer generator responsive to the speed of said motor for producing a signal voltage having a magnitude and a polarity dependent upon the magnitude and direction of variations in the speed of said motor from said predetermined value, means connected to said motor for producing an alternating voltage substantially proportional to the magnitude of the current flowing in said motor, means energized by said alternating voltage for producing a bias voltage having a magnitude and a polarity dependent upon the magnitude and direction of variations in said current from a predetermined limit value, means for impressing said bias voltage and said signal voltage on said control windings, whereby the saturations produced in the different said reactors by said signal voltage are varied oppositely by said bias voltage and the saturations of said reactors are equal when said bias voltage has zero magnitude, and regulating means connected to said reactance windings to be energized in dependence upon the difference between the saturations of said reactors for controlling the supply of current from said source to said motor to maintain said speed at said predetermined value and to prevent said current from substantially exceeding said limit value.

2. In a system for maintaining the speed of an electric motor substantially constant at a predetermined value, the combination of a source for supplying current to said motor, a polarized magnetic amplifier comprising a first saturable reactor having a first reactance winding and a first control winding and a second saturable reactor having a second reactance winding and a second control winding, means including a tachometer generator responsive to the speed of said motor for producing a signal voltage having a polarity and magnitude dependent upon the direction and magnitude of variations in said speed from said predetermined value, a common terminal for said first and second control windings, a resistor connected between the other terminals of said first and second control windings, means for impressing said signal voltage across said resistor, means connected to said motor for producing a bias voltage having a polarity and magnitude dependent upon the direction and magnitude of variations in said motor current from a predetermined limit value, an adjustable tap for said resistor, means for impressing said bias voltage between said common terminal and said adjustable tap, whereby the saturations produced in the different said reactors by said signal voltage are varied oppositely by said bias voltage and the saturations of said reactors are equal when said bias voltage has zero magnitude, and regulating means connected to said reactance windings to be energized in dependence upon the difference between the saturations of said reactors for controlling the current supplied from said source to said motor to maintain the speed of said motor substantially constant at said predetermined value and to prevent said current from substantially exceeding said limit value.

3. In a system for maintaining the speed of a direct current motor substantially constant at a predetermined value, the combination of a source for supplying current to said motor, a pair of differentially acting field windings for controlling the flow of current from said source to said motor, a first saturable reactor having a first reactance winding and a first control winding, a second saturable reactor having a second reactance winding and a second control winding, speed responsive means connected to said motor for producing a signal voltage having a polarity and magnitude dependent upon the direction and magnitude of variations in the speed of said motor from said predetermined value, means connected to said motor for producing a bias voltage having a polarity and magnitude dependent upon the direction and magnitude of variations in said current from a predetermined limit value, means for impressing said bias voltage and said signal voltage on said control winding, whereby the saturations produced in the different said reactors by said signal voltage are varied oppositely by said bias voltage and the saturations of said reactors are equal when said bias voltage has zero magnitude, and means connecting said field windings to said reactance windings to energize said field windings in dependence upon the difference between the saturations of said reactors to maintain the speed of said motor substantially consistent at said predetermined value and to prevent said current from substantially exceeding said maximum value.

4. In a system for maintaining the speed of a direct current motor substantially constant at a predetermined value, the combination of an electric generator for supplying current to said motor, a first saturable reactor having a first reactance winding and a first control winding, a second saturable reactor having a second reactance winding and a second control winding, speed responsive means connected to said motor for producing a signal voltage having a polarity and magnitude dependent upon the direction and magnitude of variations in the speed of said motor from said predetermined value, a common terminal for said first and second control windings, resistance means connected between the other terminals of said first and second control windings, means for impressing said signal voltage across said resistance means, a third saturable reactor having a saturating winding and an inductive winding, means connecting said saturating winding between said generator and said motor, a source of alternating current, a resistor, a saturable transformer having a primary winding and a secondary winding, means connecting said inductive winding, said resistor and said primary winding in circuit with each other across said source of alternating current to impress on said resistor and said primary winding a voltage proportional to the magnitude of the current supplied to said motor, means including rectifier means connected to said secondary winding and to said resistor for producing a bias voltage having a polarity and magnitude dependent upon the direction and magnitude of variations in said motor current from a predetermined limit value, an adjustable tap for said resistance means, means for impressing said bias voltage between said common terminal and said adjustable tap, whereby the saturations produced in the different said reactors by said signal voltage are varied oppositely by said bias voltage and the saturations of said reactors are equal when said bias voltage has zero magnitude, and a pair of differentially acting field windings connected to said reactance windings to be energized in dependence upon the difference between the saturations of said reactors for controlling said generator to maintain said speed substantially constant at said predetermined value and to prevent said motor current from substantially exceeding said limit value.

5. In a system for maintaining the speed of an electric motor substantially constant at a predetermined value, the combination of a source for supplying current to said motor, a first saturable reactor having a first reactance winding and first control winding means, a second saturable reactor having a second reactance winding and second control winding means, means including a tachometer generator responsive to the speed of said motor for producing a signal voltage having a polarity and magnitude dependent upon the direction and magnitude of variations in the speed of said motor from said predetermined value, means responsive to the magnitude of the current in said motor for producing a bias voltage having a polarity and magnitude dependent upon the direction and magnitude of variations in said current from a predetermined limit value, means for impressing said bias voltage and said signal voltage on said first and second control winding means, whereby the saturations produced in the different said reactors by said signal voltage are varied oppositely by said bias voltage, and regulating means connected to said reactance windings to be energized in dependence upon the difference between the saturations of said reactors for controlling said source to maintain the speed of said motor at said predetermined value and to prevent said current from substantially exceeding said limit value.

6. In a system for maintaining the speed of an electric motor substantially constant at a predetermined value, the combination of a source for supplying current to said motor, a polarized magnetic amplifier comprising a first saturable reactor having a first reactance winding and a first control winding and a second saturable reactor having a second reactance winding and a second control winding, means including a tachometer generator connected to said motor for producing a signal voltage having a polarity and a magnitude dependent upon the direction and magnitude of variations in the speed of said motor from said predetermined value, means connected to said motor for producing a bias voltage having a polarity and a magnitude dependent upon the direction and magnitude of variations in said current from a predetermined limit value independently of the polarity of said current, means for impressing said bias voltage and said signal voltage on said control windings, whereby the saturations produced in the different said reactors by said signal voltage are varied oppositely by said bias voltage, and regulating means connected to said reactance winding and energized in dependence upon the difference between the saturations of said reactors for controlling said source to maintain the speed of said motor at said predetermined value and to prevent said current from substantially exceeding said limit value.

7. In a system for maintaining the speed of an electric motor substantially constant at a predetermined value, the combination of a source for supplying current to said motor, a first saturable reactor having a first reactance winding, a first signal winding and a first bias winding, a second saturable reactor having a second reactance winding, a second signal winding and a second bias winding, means connected to said motor for producing a signal voltage having a polarity and magnitude dependent upon the direction and magnitude of variations in said speed from said predetermined value, means for impressing said signal voltage on said first and second signal windings, means connected to said motor for producing a bias voltage having a polarity and magnitude dependent upon the direction and magnitude of variations in said current from a predetermined limit value independently of the polarity of said current, means for impressing said bias voltage on said first and second bias windings, whereby the saturations produced in the different said reactors by said signal voltage are varied oppositely by said bias voltage, and regulating means connected to said first and second reactance windings and energized in dependence upon the difference between the saturations of said reactors for controlling said source to maintain the speed of said motor at said predetermined value and to prevent said current from substantially exceeding said limit value.

8. In a system for maintaining the speed of an electric motor substantially constant at a predetermined value, the combination of a source for supplying current to said motor, a polarized magnetic amplifier comprising a first saturable reactor having a first reactance winding and a first control winding and a second saturable reactor having a second reactance winding and a second control winding, means including a tachometer generator responsive to the speed of said motor for producing a signal voltage having a polarity and magnitude dependent upon the direction and magnitude of variations in said speed from said predetermined value, a common terminal for said first and second control windings, a resistor connected between the other terminals of said first and second control windings, means for impressing said signal voltage across said resistor, a shunt connected between said motor and said source, a full wave rectifier connected across said shunt to produce a voltage proportional to the current in said motor, a battery connected to said rectifier for producing a bias voltage having a polarity and magnitude dependent upon the direction and magnitude of variations in said motor current from a predetermined limit value, an adjustable tap for said resistor, means for impressing said bias voltage between said common terminal and said adjustable tap, whereby the saturations produced in the different said reactors by said signal voltage are varied oppositely by said bias voltage and the saturations of said reactors are equal when said bias voltage has zero magnitude, and regulating means connected to said reactance windings to be energized in dependence upon the difference between the saturations of said reactors for controlling the current supplied from said source to said motor to maintain the speed of said motor substantially constant at said predetermined value and to prevent said current from substantially exceeding said limit value.

9. In a system for maintaining the speed of an electric motor substantially constant at a predetermined value, the combination of a source for supplying current to said motor, a first saturable reactor having a first reactance winding, a first signal winding and a first bias winding, a second saturable reactor having a second reactance winding, a second signal winding and a second bias winding, means connected to said motor for producing a signal voltage having a polarity and magnitude dependent upon the direction and magnitude of variations in said speed from said predetermined value, means for impressing said signal voltage on said first and second signal windings, means connected to said motor for producing a bias voltage having a polarity and magnitude dependent upon the direction and magnitude of variations in said current from a predetermined limit value, means for impressing said bias voltage on said first and second bias windings, whereby the saturations produced in the different said reactors by said signal voltage are varied oppositely by said bias voltage, and regulating means connected to said first and second reactance windings and energized in dependence upon the difference between the saturations of said reactors for controlling said source to maintain the speed of said motor at said predetermined value and to prevent said current from substantially exceeding said critical value.

10. In a system for controlling first and second operating conditions of an electric translating device, the combination of regulating means for controlling said conditions, a polarized magnetic amplifier comprising a first saturable reactor having a first reactance winding and first control winding means and a second saturable reactor having a second reactance winding and second control winding means, means connecting said reactance windings with said regulating means to cause said regulating means to be energized in dependence upon the difference between the saturations of said reactors, means connected to said device for producing a signal voltage having a polarity and a magnitude dependent upon the direction and magnitude of variations of said first condition from a predetermined value, means for producing a reference voltage, means connected to said device for producing a control voltage proportional to said second condition, means responsive to the difference of said reference voltage and said control voltage for producing a bias voltage having a polarity and a magnitude dependent upon the direction and magnitude of variations in said second condition from a predetermined limit value, and means for impressing said bias voltage and said signal voltage on said control winding means to cause the saturations produced in the different said reactors by said signal voltage to be varied oppositely by said bias voltage, said regulating means being energized in the direction to increase the magnitudes of said conditions when said bias voltage and said signal voltage act cumulatively on said first control winding and said regulating means being energized in a direction to decrease the magnitude of said conditions when said bias voltage and said signal voltage act cumulatively on said second control winding means, whereby said bias voltage and said signal voltage act cumulatively on said second control winding means when said second operating condition exceeds said limit value to energize said regulating means in a direction to prevent said second condition from substantially exceeding said limit value.

11. In a system for controlling first and second operating conditions of an electric translating device, the combination of regulating means for controlling said conditions, a polarized magnetic amplifier comprising a first saturable reactor having a first reactance winding and first control winding means and a second saturable reactor having a second reactance winding and second control winding means, means connecting said reactance windings with said regulating means to cause said regulating means to be energized in dependence upon the difference between the saturations of said reactors, means connected to said device for producing a first control voltage responsive to the magnitude of said first condition, means for producing a first reference voltage, means responsive to the difference of said first control voltage and said first reference voltage for producing a signal voltage having a polarity and a magnitude dependent upon the direction and magnitude of varations of said first condition from a predetermined value, means for producing a second reference voltage, means connected to said device for producing a second control voltage proportional to said second condition, means responsive to the difference of said second reference voltage and said second control voltage for producing a bias voltage having a polarity and a magnitude dependent upon the direction and magnitude of variations in said second condition from a predetermined limit value, and means for impressing said bias voltage and said signal voltage on said control winding means to cause the saturations produced in the different said reactors by said signal voltage to be varied oppositely by said bias voltage, said regulating means being energized in the direction to increase the magnitudes of said conditions when said bias voltage and said signal voltage act cumulatively on said first control winding and said regulating means being energized in a direction to decrease the magnitude of said conditions when said bias voltage and said signal voltage act cumulatively on said second control winding means, whereby said bias voltage and said signal voltage act cumulatively on said second control winding means when said second operating condition exceeds said limit value to energize said regulating means in a direction to prevent said second condition from substantially exceeding said limit value.

References Cited in the file of this patent

UNITED STATES PATENTS

| Number | Name | Date |
| --- | --- | --- |
| 2,456,938 | Harder | Dec. 21, 1948 |
| 2,498,281 | Kovalsky | Feb. 21, 1950 |

FOREIGN PATENTS

| Number | Country | Date |
| --- | --- | --- |
| 361,984 | Italy | Aug. 9, 1938 |